US008049762B2

(12) United States Patent
Wells et al.

(10) Patent No.: US 8,049,762 B2
(45) Date of Patent: Nov. 1, 2011

(54) ARCHITECTURAL STRUCTURE DESIGN METHODS, ARCHITECTURAL STRUCTURE DESIGN APPARATUSES, AND ARTICLES OF MANUFACTURE

(75) Inventors: Gregory Wells, Coeur D'Alene, ID (US); Jason Troye, Coeur D'Alene, ID (US); Dermot Dempsey, Hayden Lake, ID (US)

(73) Assignee: Chief Architect, Inc., Coeur D' Alene, ID (US)

( * ) Notice: Subject to any disclaimer, the term of this patent is extended or adjusted under 35 U.S.C. 154(b) by 387 days.

(21) Appl. No.: 11/332,047

(22) Filed: Jan. 13, 2006

(65) Prior Publication Data

US 2007/0165044 A1    Jul. 19, 2007

(51) Int. Cl.
*G09G 5/00* (2006.01)
(52) U.S. Cl. ........ 345/581; 345/420; 345/619; 715/964; 715/966; 715/967; 706/919; 706/920; 706/921; 706/923
(58) Field of Classification Search .................. 345/581, 345/582
See application file for complete search history.

(56) References Cited

U.S. PATENT DOCUMENTS 6,014,503 A * 1/2000 Nagata et al. ..................... 703/1
7,425,958 B2 * 9/2008 Berger et al. ................. 345/427

OTHER PUBLICATIONS

Broderbund, 3D Home Architect Design Suite User's Guide, 2004.*
Autodesk, 3ds Max 8 Reference Guide vol. 1-2, 2005.*
Autodesk, 3ds max 7 User Reference (software help file), Oct. 13, 2004, p. 1-140.*
Autodesk, 3ds max 7 User Reference (software help file), Oct. 13, 2004, p. 141.*
Davis, Phyllis and Schwartz, Steve, "Corel Draw 10 for Windows: Visual QuickStart Guide," Nov. 6, 2001, Peachpit Press, http://proquest.safaribooksonline.com/0201773511, ch. 10, sec. 3.*
"3D Home Architect Deluxe 4.0—User's Guide" TLC Productivity Properties, LLC 2001. pp. 1-299.*
Declaration of inventor Troye regarding "Bryce 5" computer software, DAZ Productions, http://btyce.daz3d.com/55index.php, copyright 2001; 3 pp.

* cited by examiner

*Primary Examiner* — Antonio Caschera
(74) *Attorney, Agent, or Firm* — Wells St. John, P.S.

(57) ABSTRACT

Architectural structure design methods, architectural structure design apparatuses, and articles of manufacture are described according to some aspects of the disclosure. In one aspect, an architectural structure design method includes responsive to user input, modifying a visual representation of an architectural structure, wherein the visual representation comprises an object of the architectural structure, first displaying the visual representation comprising the object at a first moment in time, wherein the object is positioned at a first location of a display screen, responsive to user input, selecting an attribute for the object from a second location of the display screen which is different than the first location of the display screen, responsive to user input, associating the attribute with the object after the selecting, and displaying the visual representation comprising the object having the attribute at a second moment in time after the associating.

40 Claims, 4 Drawing Sheets

ARCHITECTURAL STRUCTURE DESIGN METHODS, ARCHITECTURAL STRUCTURE DESIGN APPARATUSES, AND ARTICLES OF MANUFACTURE

TECHNICAL FIELD

This disclosure relates to architectural structure design methods, architectural structure design apparatuses, and articles of manufacture.

BACKGROUND

Personal computing devices are ubiquitous at homes, schools and the workplace. The ever increasing capabilities and functions provided by computing devices have led to their usage in numerous applications. Some applications for computing devices have been introduced to assist users with design and visualization of architectural structures, such as residential homes, offices, etc. These applications have been designed to generate structural designs, to facilitate modifications of structural designs and to provide visual representations of structures defined by the designs. At least some aspects of the disclosure describe apparatus, methods and articles of manufacture which may further facilitate generation and modification of architectural structural designs.

BRIEF DESCRIPTION OF THE DRAWINGS

Embodiments of the disclosure are described below with reference to the following accompanying drawings.

DETAILED DESCRIPTION

According to one embodiment of the disclosure, an architectural structure design apparatus is configured to facilitate design, creation and/or modification of architectural structures. In some illustrative examples described further below, architectural structure design apparatus is configured to facilitate assigning of attributes within architectural structures.

According to one aspect of the disclosure, an architectural structure design method comprises, responsive to user input, modifying a visual representation of an architectural structure, wherein the visual representation comprises an object of the architectural structure, first displaying the visual representation comprising the object at a first moment in time, wherein the object is positioned at a first location of a display screen, responsive to user input, selecting an attribute for the object from a second location of the display screen which is different than the first location of the display screen, responsive to user input, associating the attribute with the object after the selecting, and displaying the visual representation comprising the object having the attribute at a second moment in time after the associating.

According to an additional aspect of the disclosure, an architectural structure design apparatus comprises a display configured to depict a visual representation of an architectural structure being designed using the architectural structure design apparatus, a user interface configured receive user inputs, and processing circuitry coupled with the display and the user interface, wherein the processing circuitry is configured to control the display screen to depict the visual representation, to modify the visual representation including associating an attribute from one location of the visual representation with an other location of the visual representation different than the one location, and to control the display screen to depict the other location of the visual representation having the attribute.

According to another aspect of the disclosure, an article of manufacture comprises media comprising programming configured to cause processing circuitry to perform processing comprising first controlling a depiction of a visual representation of an architectural structure at a first moment in time, modifying a configuration of the visual representation responsive to user input after the first moment in time, copying an attribute from one surface of the visual representation to an other surface of the visual representation after the first moment in time, and second controlling the depiction of the visual representation at a second moment in time after the modification and the copying.

Figure 1:
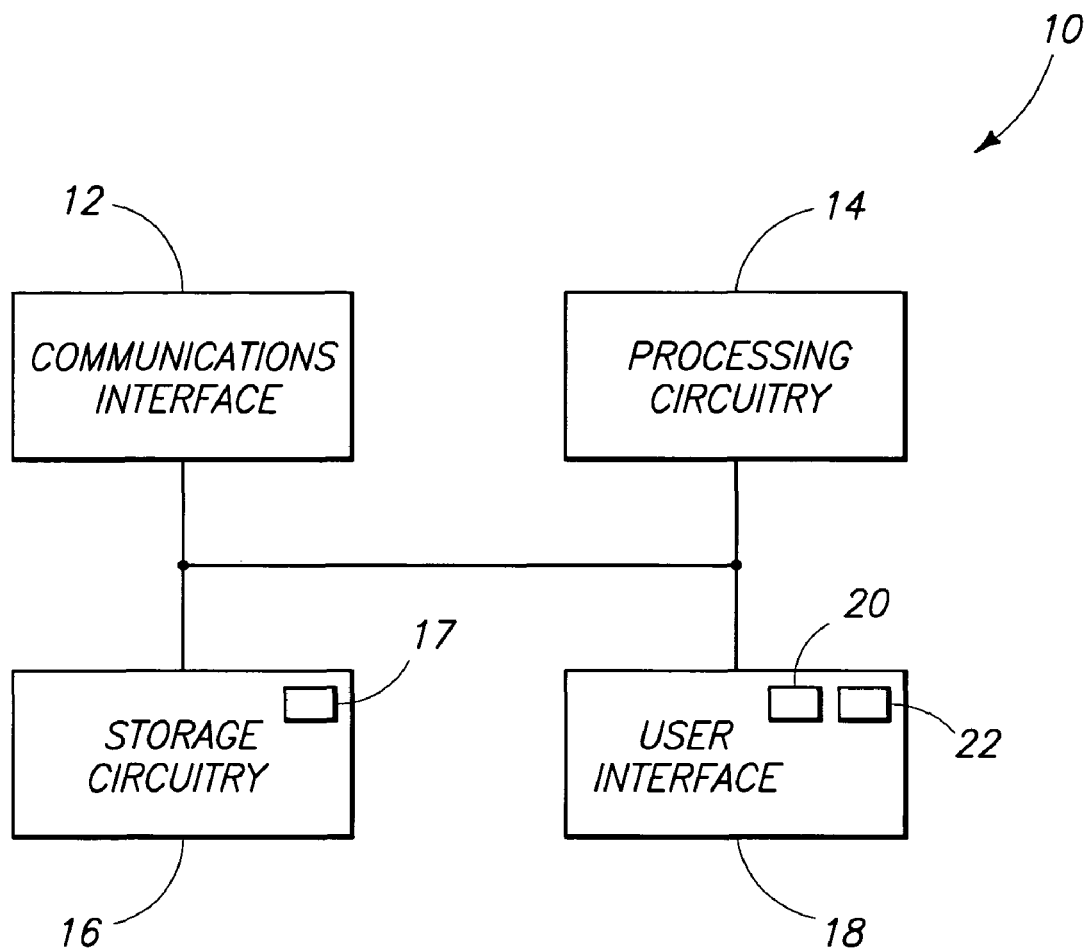
FIG. 1 is a block diagram of an architectural structure design apparatus according to one embodiment.

Referring to FIG. 1, an architectural structure design apparatus 10 is illustrated according to one embodiment. The illustrated exemplary architectural structure design apparatus 10 includes a communications interface 12, processing circuitry 14, storage circuitry 16, and a user interface 18. For example, in exemplary embodiments, apparatus 10 may be embodied as a personal computer (PC) utilizing a Windows® Operating System available from Microsoft Corporation, a Macintosh® computer available from Apple Computer, Inc., a work station, or other suitable configuration. Further, other configurations of architectural structure design apparatus 10 are possible in other embodiments including more, less and/or alternative components.

Communications interface 12 is arranged to implement communications of architectural structure design apparatus 10 with respect to external devices and/or networks (not shown). For example, communications interface 12 may be arranged to communicate information bi-directionally with respect to architectural structure design apparatus 10. Communications interface 12 may be implemented as a network interface card (NIC), serial or parallel connection, USB port, Firewire interface, flash memory interface, floppy disk drive, or any other suitable arrangement for communicating with respect to architectural structure design apparatus 10.

In one embodiment, processing circuitry 14 is arranged to process data, control data access and storage, issue commands, and control other desired operations of apparatus 10. Processing circuitry 14 may comprise circuitry configured to implement desired programming provided by appropriate media in at least one embodiment. For example, the processing circuitry 14 may be implemented as one or more of a processor or other structure configured to execute executable instructions including, for example, software or firmware instructions, and/or hardware circuitry. Exemplary embodiments of processing circuitry 14 include hardware logic, PGA, FPGA, ASIC, state machines, or other structures alone or in combination with a processor. These examples of processing circuitry 14 are for illustration and other configurations are possible.

The storage circuitry 16 is configured to store programming such as executable code or instructions (e.g., software or firmware), electronic data, databases, or other digital information, and may include processor-usable media. Processor-usable media may be embodied in any computer program product or article of manufacture 17 which can contain, store, or maintain programming, data or digital information for use by or in connection with an instruction execution system including processing circuitry 14 in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, or other configurations capable of storing programming, data, or other digital information.

At least some embodiments or aspects described herein may be implemented using programming stored within appropriate storage circuitry 16 described above or communicated via a network or other transmission media and configured to control appropriate processing circuitry 14. For example, programming may be provided via appropriate media including, for example, embodied within articles of manufacture 17, embodied within a data signal (e.g., modulated carrier wave, data packets, digital representations, etc.) communicated via an appropriate transmission medium, such as a communication network (e.g., the Internet or a private network), wired electrical connection, optical connection or electromagnetic energy, for example, via communications interface 12, or provided using other appropriate communication structure or medium. Exemplary programming including processor-usable code may be communicated as a data signal embodied in a carrier wave in but one example.

User interface 18 is configured to interact with a user including receiving user input and/or conveying information to a user. In the depicted embodiment, user interface 18 includes an input device 20 and an output device 22. An exemplary input device 20 is arranged to receive tactile input from a user and may be embodied as a keyboard and/or mouse. Further, output device 22 is configured to convey information to a user and may be embodied as a display (e.g., monitor) configured to depict visual images for observation by a user. Other configurations of user interface 18 are possible in other embodiments.

Figure 2:
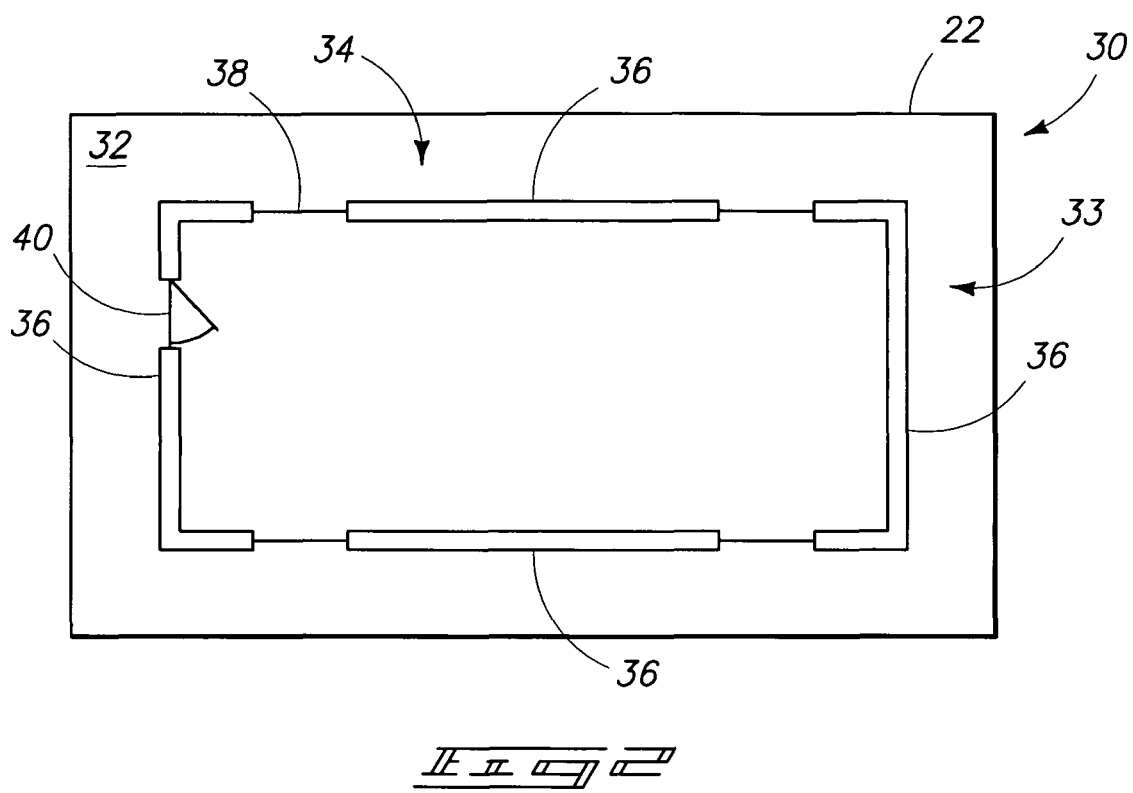
FIG. 2 is an illustrative representation of an image generated by a display screen according to one embodiment.

Referring to FIG. 2, an exemplary image 30 generated using a display screen of output device 22 is shown. In FIG. 2, the display screen may correspond to the box associated with reference 22. In other embodiments, display screen may refer to plural display screens of plural output devices generating images with respect to an architectural structure being designed or modified.

The depicted image 30 includes a workspace 32 and a visual representation 33 of an architectural structure. Image 30 may be provided within an application window (not shown in FIG. 2) in one embodiment. Visual representation 33 is in the form of a building plan 34 in FIG. 2. Workspace 32 may be used for drawing or modifying images, such as building plan 34. Building plan 34 may refer to a plan view representation of an architectural structure in one embodiment although the architectural structure may be represented in other representations or views in other embodiments. For example, a user may select visual representations 33 of interior views (e.g., perspective, isometric, side), exterior views (e.g., perspective, isometric, side), or any other views desired with respect to the architectural structure being processed. In addition, different visual representations 33 (e.g., building plan 34 and one or more alternative view) of the architectural structure may be simultaneously depicted using output device 22 (e.g., in a tiled arrangement).

A user may manipulate input device 20 to create building plan 34 in one embodiment. In another embodiment, a file of a previously generated building plan 34 may be accessed from storage circuitry 16 or other source and used to create images 30. A user may interact with the building plan 34 to implement desired modifications and/or additions. In addition, a user may interact with other views of architectural structures, for example, as described with respect to FIG. 3 below.

As mentioned above, the depicted exemplary building plan 34 corresponds to an architectural structure, such as a house, although other structures may be generated and/or modified. A user may configure building plan 34 to include a plurality of objects. According to one embodiment, objects may comprise structures or components which may moved and/or manipulated by a user within a visual representation and may include a plurality of separately identifiable subcomponents (e.g., an exemplary object comprising a cabinet may include subcomponents comprising walls, a counter top, and a door). In one embodiment, the subcomponents may be associated with one another, for example within a library of the storage circuitry 16, and a user may select the object for inclusion in a visual representation without having to construct the object itself by arranging the subcomponents. In an additional aspect, a user may select and manipulate an object (e.g., move the object to a new location) without selecting and manipulating the individual subcomponents of the object. A user may selectively modify attributes of one or more of the subcomponents of an object if desired and in accordance with one embodiment.

Referring again to FIG. 2, exemplary objects may include walls 36, windows 38, and a door 40 in the illustrated example. Additional objects are possible and may include additional structures commonly designed with respect to architectural structures and which may include a plurality of subcomponents. For example, objects may include cabinets, counters, light fixtures, bathroom fixtures, floors, and ceilings.

A user may draw the walls 36 of building plan 34 during the design of an architectural structure by using input device 20 comprising a mouse and similar to drawing on paper in one example. A user may also modify existing configurations of an architectural structure. For example, a user may modify a configuration of an architectural structure by moving, adding or deleting objects. In one example, a user may add objects such as interior walls (not shown) to the building plan 34.

The objects may have one or more associated attributes in one embodiment. Exemplary attributes of the objects may include visual characteristics indicative of how objects or surfaces of the objects are visually perceived, for example, in a visual representation 33 of an architectural structure. Visual characteristics may include surface characteristics of visible surfaces of the objects in one embodiment.

In more specific examples, attributes comprising surface characteristics may include colors, textures, patterns and/or lighting properties of the surfaces of the objects. In one implementation, textures may be specified by respective texture files (e.g., stored images of a shingle, wood panel, or other texture) and the contents of the file may be replicated a plurality of times over a surface of one or more object. In one embodiment, patterns may individually include an array of lines (e.g., herringbone, cross-hatching, etc.) which may be associated with a surface of an object as desired. Lighting properties of an object surface may refer to specular highlights, surface reflectivity, transparency, etc. in illustrative examples. Other attributes including other surface characteristics or other types of attributes may be associated with objects in other embodiments. Additional exemplary types of attributes of objects include materials. For example, an object comprising a wall may have an associated attribute specifying a material of the wall (e.g., wood, wood paneling, brick, brick paneling, etc.) The attributes may be associated with objects by default and/or a user may configure the attributes as desired.

As mentioned above, architectural structure design apparatus 10 is configured to facilitate design, creation and/or modification of architectural structures in one embodiment. In more specific examples described below, apparatus 10 may facilitate operations with respect to the attributes of the visual representations including, assigning or associating attributes with respect to objects or subcomponents of objects. For example, apparatus 10 may permit attributes to be easily defined and/or associated with objects or subcomponents thereof in one embodiment.

Figure 3:
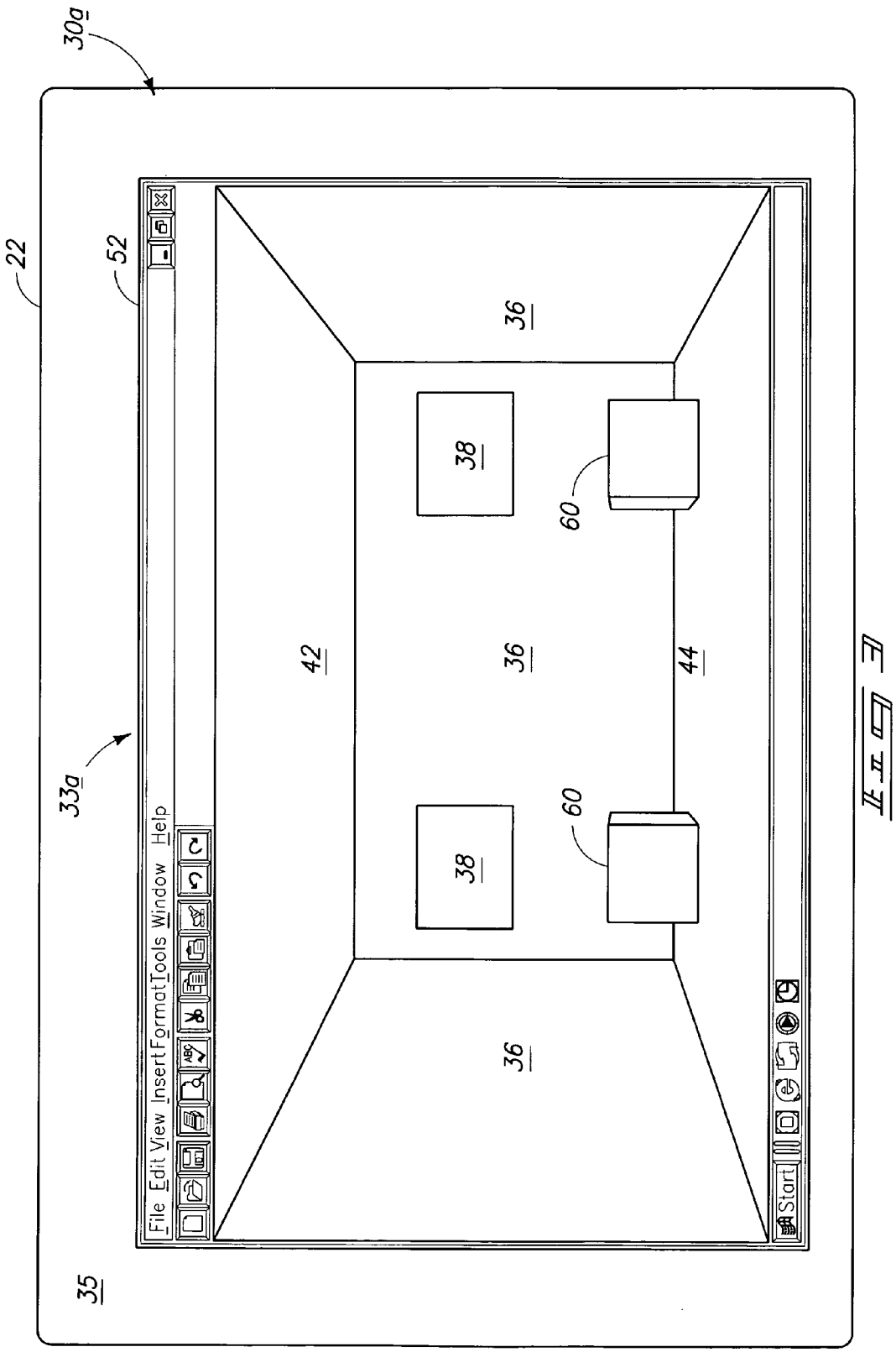
FIG. 3 is an illustrative representation of another image generated by a display screen according to one embodiment.

Referring to FIG. 3, another exemplary image 30a generated by output device 22 according to one embodiment is shown. The illustrated image 30a includes another visual representation 33a of an architectural structure and a desk top 35 both depicted using a display screen of output device 22 (e.g., the box associated with reference 22 of FIG. 3 may again correspond to the display screen of the output device). The exemplary visual representation 33a is in the form of an interior perspective view of an architectural structure in FIG. 3 and may correspond to the architectural structure, for example, of the building plan 34 of FIG. 2. As shown in the depicted example, visual representation 33a includes objects comprising walls 36 and windows 38 and may additionally include objects comprising a ceiling 42 and a floor 44 of an architectural structure.

In the illustrated exemplary configuration, visual representation 33a is illustrated within a graphical window 52 upon desk top 35. The visual representation 33a may be generated by a user, previously generated and accessed from storage circuitry 16, or otherwise accessed. The user may generate and/or modify the respective building plan 34 and then change to a desired view for example as represented by visual representation 33a. Alternatively, a user may generate and/or modify the architectural structure using the visual representation 33a of FIG. 3.

In addition, visual representation 33a also includes additional objects in the form of cabinets 60 in the exemplary embodiment. The objects comprising cabinets 60 may be selected, moved, and positioned by a user at desired locations within the interior of the architectural structure. Although aspects of the disclosure are described below with respect to interior objects, the aspects also apply to any other objects being depicted by apparatus 10, and may include, for example, exterior objects outside of the architectural structure.

As mentioned previously, architectural structure design apparatus 10 may assist a user with creation and/or modification of designs of architectural structures including facilitating operations with respect to attributes of objects of the architectural structure. In the exemplary embodiments described below, structures and methods are disclosed which enable one or more attributes to be easily selected and associated with one or more objects of a architectural structure being designed.

In the exemplary embodiment of FIG. 3, a user may provide the illustrated objects 60 (e.g., cabinets in the illustrated example) at desired locations of the interior of the architectural structure. The user may select the cabinets from an appropriate library and place them at desired locations in one implementation. The objects may or may not have associated attributes, for example when placed by a user, and a user may be desirous of assigning or changing the attributes of one or more of the objects.

According to one embodiment, apparatus 10 may include an operational mode to facilitate the assignment of attributes. For example, a user may provide user input (e.g., selection of an icon) indicating to apparatus 10 that they wish to assign or modify an attribute of an object. Thereafter, the user may manipulate input device 20 to select one or more desired attribute to be copied from one location of a screen of a display to another location of the screen in one illustrative implementation. In a more specific example of one embodiment, the user may move a cursor (not shown) to a desired location of the display screen of output device 22 to select the desired one or more attribute to be copied or otherwise arranged. Once the cursor is placed at an appropriate location (e.g., pixel or group of pixels) for the attribute(s) to be selected, a user may depress a mouse button or use other input which selects one or more attribute associated with the location.

Additional details of one embodiment are described further below where a user may select attribute(s) of one object of the architectural structure and associate them with another object. The user may position the cursor at a pixel within window 52, for example at a pixel of a desired surface of an object which has attribute(s) to be copied (e.g., a front door of cabinet 60), and select one or more attributes of the surface of the object, for example, with a single mouse click. For example, if a surface of an object is chosen, apparatus 10 may extract one or more attributes associated with the surface. The attributes may include colors, patterns, textures, and/or lighting properties in one embodiment. In one embodiment, the extracted attributes may remain with the object from which they were extracted if desired by the user.

Once a location is identified for extraction of attributes and/or after extraction, the user may modify the extracted attributes of the location. In one example, a user may access a menu which may identify the attribute(s) associated with the selected location and delete one or more of the attributes if such are not be assigned to other objects. Deleted attributes may remain with the objects from which they were selected in one embodiment. A user may also add additional attributes not extracted from the selected location and to be associated with one or more additional object. For example, the additional attributes may be stored within a library and selected by a user.

Additional embodiments of apparatus 10 may permit a user to select attributes (e.g., colors) from locations outside of window 52 in one embodiment. For example, a user may move a cursor to a location of the desk top 35 outside of window 52 and select an attribute associated with a respective pixel location of the desktop 35. In illustrative examples, the pixel and the attribute may be associated with another window (not shown), desk top 35, icon, photographic image, or other visual image displayed using the screen of output device 22.

In one implementation, apparatus 10 may control output device 22 to provide a window to assist with the selection of the attribute(s). For example, the apparatus 10 may display a Windows® color dialog window to display attributes comprising colors in real time corresponding to movements of a cursor over different pixel locations by the user. The colors may be displayed corresponding to pixel locations inside or outside of window 52 in one implementation.

In one embodiment, an application associated with window 52 (e.g., architectural design software being used) remains active during the selection of attribute(s) outside of the window 52. In one implementation, the application associated with window 52 when placed in the attribute extraction mode may request an operating system of apparatus 10 to inform the application of movements of the cursor by the user outside of the window 52. For example, a user may hold down a left mouse button over an icon within window 52 to enter an attribute extraction mode of operation. Thereafter, the cursor may be moved outside of window 52 while the user maintains the left mouse button in a down or depressed state to retain focus with the application associated with window 52. When informed of the movements, the application may request the operating system to provide information regarding the attribute(s) (e.g., color) of the pixels corresponding to the locations of the cursor. The application may control the display of the attribute information within a dialog window (not shown) to assist the user with the extraction of attributes in one embodiment. Once the cursor is positioned over a pixel or group of pixels having a desired attribute for extraction, the user may perform a left mouse button release operation to select or extract the attribute. Other selection operations may be used in other embodiments.

Following the selection and modification (if desired) of the selected attribute(s), the user may associate the attribute(s) with another location of the display screen. In one embodiment, the user may move the cursor and provide input (e.g., depress a mouse button) when the cursor is placed at an appropriate location (e.g., object surface) to associate the respective attribute(s) with the selected location. In one embodiment, the desired location may correspond to any desired object of the architectural structure, such as walls, windows, doors, etc. If a user positions a cursor upon a surface of an object, the extracted attribute(s) may be associated with the surface upon the depressing of the mouse button in one implementation.

In one embodiment, attribute(s) may be selected from one of a plurality of subcomponents of an object and/or applied to one of a plurality of subcomponents of an object. For example, attribute(s) may be extracted from and/or assigned with respect to only a subcomponent comprising a window frame of an object comprising a window or a cabinet door of an object comprising a cabinet in illustrative examples). Attribute(s) may be selected and/or associated only with one subcomponent of an object by moving the cursor to the location of the desired subcomponent and depressing a mouse button in one embodiment. In another embodiment, the attributes may be applied to entireties of objects.

Figure 4:
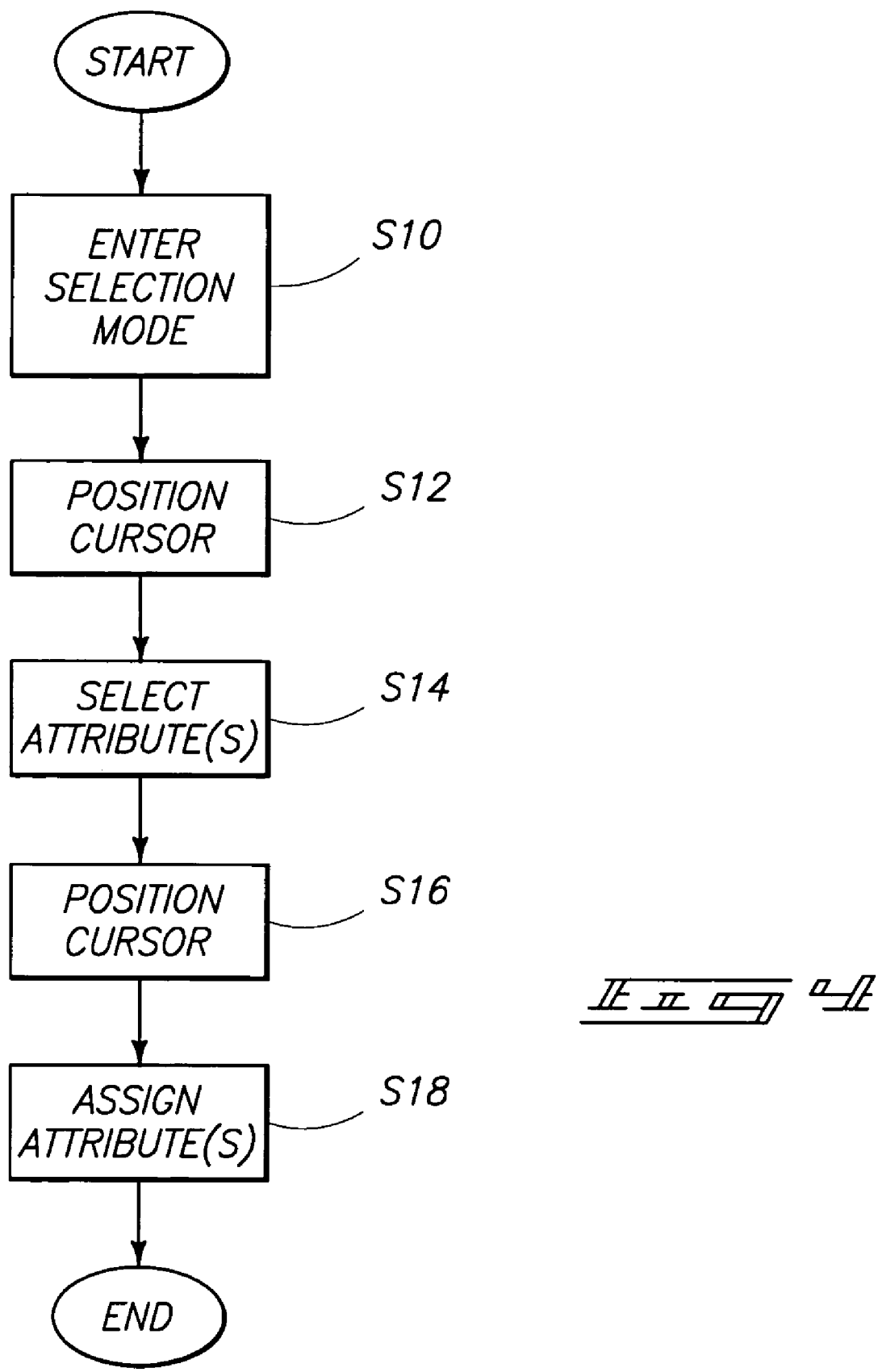
FIG. 4 is a flow chart of an exemplary method according to one embodiment.

Referring to FIG. 4, an exemplary method for extracting one or more attributes and associating the attributes is shown according to one embodiment. The exemplary method may be executed by apparatus 10 in one implementation. For example, in one embodiment, processing circuitry 14 of apparatus 10 may execute ordered instructions (e.g., software) to implement the depicted method. Other methods are possible including more, less and/or alternative steps.

At a step S10, the user may provide an instruction selecting operation of the apparatus 10 in a mode of operation to select and extract attributes for association with one or more object of an architectural structure. For example, the user may click on an appropriate icon to enter an attribute selection mode of operation. In one embodiment, the user may select and/or associate attributes using a visual representation of the architectural structure in the form of a perspective view (e.g., FIG. 3). In another embodiment, a user may select and/or associate attributes using a visual representation of the architectural structure in the form of the building plan (e.g., FIG. 2). Other types of visual representations may be used for selection and/or assigning attributes in other embodiments.

At a step S12, the user may use an input device to select attribute(s) associated with a first location of a display screen of an output device. For example, the user may move a cursor to a location inside or outside of an application window containing an architectural structure being designed. In one example, the user may place the cursor upon a surface of an object (or upon a surface of a subcomponent of an object) of an architectural structure which has one or more attributes to be copied to another object or subcomponent of an object.

At a step S14, the user may select and extract the attribute(s) associated with the location of the cursor by a mouse click in one configuration. The apparatus 10 may enter a mode of operation to assign or associate the attribute(s) after the selection of step S14 in one embodiment.

In one embodiment, attributes may have respective identifiers individually configured to identify one or more files of the respective attribute(s) in a library (e.g., files defining the attributes such as colors, materials textures, patterns, lighting properties, etc.). The selection by the user may extract identifier(s) from the selected location of the screen of the display and the identifier(s) may be used to identify respective files corresponding to the attribute(s) and stored for example in the storage circuitry.

In one embodiment, the user may also modify the attributes after the selection. For example, if a plurality of attributes are selected, the user may wish to delete one or more of the attributes not to be associated with other locations of the display screen (e.g., objects of the architectural structure). Also, the user may add one or more attributes if desired to the selected and extracted attributes.

At a step S16, the user may position the cursor to another location of the display screen which is different than the location of step S12 used to select and extract the attributes. The user may place the cursor at a location where the selected and extracted attributes are to be assigned. In one example, the location of step S16 may correspond to an object or a subcomponent of an object of an architectural structure or surfaces of the object or subcomponent. In one embodiment, a user may select at step S16 a plurality of locations or objects to receive the attribute(s) selected and perhaps modified at step S14.

At a step S18, the user may use the input device to assign or associate the selected, extracted and perhaps modified attribute(s) to the location of the display screen selected at step S16. If identifiers described above are used, the processing circuitry may use one or more identified files to associate the attribute(s) with the desired location. As mentioned above, attributes may be associated with less than all of the subcomponents of an object at step S18 if instructed by the user. Furthermore, steps S16 and S18 may be performed a plurality of times in one embodiment to assign the attribute(s) selected in step S14 to a plurality of different locations or objects.

Although not expressly depicted in FIG. 4, the processing circuitry may control the display to depict the visual representation of the architectural structure during execution of the steps of the method of FIG. 4. Furthermore, the location (e.g., object) identified at step S16 may be displayed having the respective associated attribute(s) after execution of step S18 in one implementation. Also, the location from which the attribute was selected in step S12 may be depicted with the attribute.

In compliance with the statute, the disclosure has been described in language more or less specific as to structural and methodical features. It is to be understood, however, that the disclosure is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples. Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. An architectural structure design method comprising:
using processing circuitry, creating a visual representation of an architectural structure, wherein the creating comprises creating a building plan of the architectural structure as a result of user input;
as a result of user input, modifying the visual representation of the architectural structure, wherein the visual representation includes an object of the architectural structure;
first displaying the visual representation comprising the object at a first moment in time, wherein the object is positioned at a first location of a display screen;
as a result of user input, selecting one of a plurality of attributes for the object from a second location of the display screen which is different than the first location of the display screen and without display of a list of the attributes;
as a result of user input, associating the attribute with the object after the selecting and without display of a list of the attributes; and
second displaying the visual representation comprising the object with the attribute at a second moment in time after the associating.

2. The method of claim 1 wherein the attribute comprises one of a plurality of different visual characteristics indicative of how the object is visually perceived.

3. The method of claim 1 wherein the attribute comprises an attribute comprising a surface characteristic of a visible surface of the object.

4. The method of claim 1 wherein the attribute comprises one of a plurality of textures.

5. The method of claim 1 wherein the attribute comprises one of a plurality of patterns.

6. The method of claim 1 wherein the object comprises an initial object, and wherein the first displaying comprises displaying the visual representation comprising an other object positioned at the second location, and the selecting comprises selecting the attribute from the other object.

7. The method of claim 1 wherein the first and second displayings comprise displaying the respective visual representations within a window, and the second location is external of the window.

8. The method of claim 1 wherein the selecting and associating comprise selecting and associating using processing circuitry.

9. The method of claim 1 wherein the object comprises a plurality of subcomponents, and the associating comprising associating the attribute with less than all of the subcomponents of the object.

10. The method of claim 1 wherein the selecting and the associating comprise selecting and associating a plurality of attributes, and further comprising after the selection and prior to the assigning, modifying the attributes.

11. The method of claim 1 wherein the first location is within a window associated with an application configured to perform the first displaying and the second displaying and the second location is outside of any portions of the display screen which are associated with the application, and wherein the selecting comprises maintaining focus of an operating system with the application associated with the window during the selecting.

12. The method of claim 1 wherein the selecting comprises selecting a plurality of the attributes from an object, and further comprising deleting one of the selected attributes from the selection after the selecting.

13. The method of claim 1 wherein the first displaying and the second displaying individually comprise displaying the visual representation within a window associated with an application configured to perform the first displaying and the second displaying, and wherein the associating comprises directly associating the attribute with the object after the selecting, and wherein the selecting and associating comprise selecting and associating without use of any graphical user interface elements other than a pointer user interface element and the window within which the visual representation is displayed.

14. The method of claim 1 wherein the object comprises an initial object and wherein the selecting comprises selecting the one attribute from the initial object and comprises the only selecting of the one attribute before the associating of the attribute with the object.

15. The method of claim 1 wherein the modifying comprises modifying a footprint of the building plan.

16. An architectural structure design apparatus comprising:
a display comprising a display screen configured to depict a visual representation of an architectural structure being designed using the architectural structure design apparatus within a window;
a user interface configured to receive user inputs; and
processing circuitry coupled with the display and the user interface, wherein the processing circuitry is configured to execute an application to create the visual representation which comprises a building plan of the architectural structure as a result of the user inputs, to control the display screen to depict the visual representation, to modify the visual representation including associating an attribute from one location of the display screen with one location of the visual representation which is different than the one location of the display screen, and to control the display screen to depict the visual representation having the attribute associated with the one location of the visual representation, and wherein the processing circuitry is configured to select the attribute, before the associating, from the one location of the display screen which is not associated with the application and to select and associate the attribute only using graphical user interface elements which include a pointer user interface element and the window depicting the visual representation.

17. The apparatus of claim 16 wherein the processing circuitry is configured to associate the attribute as a result of one of the user inputs.

18. The apparatus of claim 16 wherein the processing circuitry is configured to position a cursor at the one location of the display screen to select the attribute and to position the cursor at the one location of the visual representation to associate the attribute as a result of respective ones of the user inputs.

19. The apparatus of claim 16 wherein the visual representation comprises an object positioned at the one location of the visual representation, and the processing circuitry is configured to associate the attribute with the object.

20. The apparatus of claim 19 wherein the attribute comprises one of a plurality of different visual characteristics of how the object is visually perceived.

21. The apparatus of claim 19 wherein the object comprises a plurality of subcomponents, and the processing circuitry is configured to associate the attribute with less than all of the subcomponents of the object.

22. The apparatus of claim 16 wherein the attribute comprises one of a plurality of lighting properties.

23. The apparatus of claim 16 wherein the selecting and the associating comprise selecting and associating a plurality of attributes, and wherein the processing circuitry is configured to modify the attributes as a result of one of the user inputs.

24. The apparatus of claim 16 wherein the processing circuitry is configured to select the attribute and to associate the attribute without a list of the attributes being displayed using the display.

25. The apparatus of claim 16 wherein the processing circuitry is configured to select and associate the attribute without depiction of a list of attributes using the display.

26. The apparatus of claim 16 wherein the processing circuitry is configured to modify a footprint of the building plan as a result of the user inputs.

27. An article of manufacture comprising:
computer readable non-transitory media comprising programming configured to cause processing circuitry to perform processing comprising:
as a result of user input, creating a visual representation which comprises a building plan of an architectural structure;
first controlling a depiction of the visual representation of the architectural structure at a first moment in time;
modifying a configuration of the visual representation as a result of user input after the first moment in time;
directly copying an attribute from one surface of the visual representation to an other surface of the visual representation after the first moment in time; and
second controlling a depiction of the visual representation at a second moment in time after the modifying and the copying.

28. The article of claim 27 wherein the copying comprises copying as a result of user input specifying the attribute for the copying.

29. The article of claim 27 wherein the first controlling comprises controlling the depiction of the visual representation comprising a plurality of objects, and wherein the copying comprises copying an attribute of a surface of one of the objects to a surface of an other of the objects.

30. The article of claim 27 wherein the copying comprises copying the attribute comprising a visual characteristic of how the one surface is visually perceived.

31. The article of claim 27 wherein the copied attribute comprises one of a plurality of attributes, and further comprising selecting the copied attribute for the copying without a depiction of a list of the attributes.

32. The article of claim 27 wherein the copying comprises the only copying of the attribute.

33. The article of claim 27 wherein the first and second controllings individually comprise controlling the depiction of the visual representation within a window, and the copying comprises copying only using graphical user interface elements including a pointer and the window.

34. The article of claim 27 wherein the copying comprises copying without using a list of attributes.

35. The article of claim 27 wherein the modifying comprises modifying a footprint of the building plan.

36. An architectural structure design method comprising:
using processing circuitry, creating a visual representation of an architectural structure, wherein the creating comprises creating a building plan of the architectural structure as a result of user input;
as a result of user input, modifying the visual representation of the architectural structure, wherein the visual representation includes an object of the architectural structure;
first displaying the visual representation comprising the object at a first moment in time, wherein the object is positioned at a first location of a display screen;
as a result of user input, selecting an attribute for the object after the first moment in time from a second location of the display screen which depicts the displayed visual representation and which is different than the first location of the display screen;
as a result of user input, directly associating the attribute with the object after the selecting and wherein the associating the attribute with the object is the first associating of the attribute after the selecting;
second displaying the visual representation comprising the object with the attribute at a second moment in time after the associating; and
wherein the object comprises an initial object, and wherein the first displaying comprises displaying the visual representation comprising an other object positioned at the second location, and the selecting comprises selecting the attribute from the other object.

37. The method of claim 36 wherein the selecting and associating comprise selecting and associating without using a list of attributes.

38. The method of claim 36 wherein the modifying comprises modifying a footprint of the building plan after the first moment in time.

39. An architectural structure design apparatus comprising:
a display comprising a display screen configured to depict a visual representation of an architectural structure being designed using the architectural structure design apparatus;
a user interface configured to receive user inputs;
processing circuitry coupled with the display and the user interface, wherein the processing circuitry is configured to create the visual representation which comprises a building plan of the architectural structure as a result of the user inputs, to control the display screen to depict the visual representation, to modify the visual representation including associating an attribute from one location of the visual representation with an other location of the visual representation different than the one location, and to control the display screen to depict the visual representation having the attribute associated with the other location; and
wherein the processing circuitry is configured to position a cursor at the one location to select the attribute and to position the cursor at the other location to directly associate the attribute with the other location of the visual representation after the selection of the attribute from the one location of the visual representation as a result of respective ones of the user inputs.

40. An architectural structure design apparatus comprising:
- a display comprising a display screen configured to depict a visual representation of an architectural structure being designed using the architectural structure design apparatus;
- a user interface configured to receive user inputs; and
- processing circuitry coupled with the display and the user interface, wherein the processing circuitry is configured to create the visual representation which comprises a building plan of the architectural structure as a result of the user inputs, to control the display screen to depict the visual representation, to modify the visual representation including associating an attribute from one location of the visual representation with an initial object located at an other location of the visual representation different than the one location, and to control the display screen to depict the visual representation having the attribute associated with the other location; and
- wherein the visual representation comprises an other object positioned at the one location, and the processing circuitry is configured to select the attribute from the other object and to directly copy the attribute from the other object to the initial object.

* * * * *